(12) United States Patent
Loen

(10) Patent No.: US 8,350,695 B2
(45) Date of Patent: Jan. 8, 2013

(54) BODY COUPLED ANTENNA SYSTEM AND PERSONAL LOCATOR UNIT UTILIZING SAME

(75) Inventor: Andrew E. Loen, Victoria (CA)

(73) Assignee: LoJack Operating Company, LP, Canton, MA (US)

( * ) Notice: Subject to any disclaimer, the term of this patent is extended or adjusted under 35 U.S.C. 154(b) by 273 days.

(21) Appl. No.: 12/803,338

(22) Filed: Jun. 24, 2010

(65) Prior Publication Data
US 2011/0316693 A1 Dec. 29, 2011

(51) Int. Cl.
G08B 1/08 (2006.01)

(52) U.S. Cl. .......... 340/539.13; 340/539.1; 340/539.11; 343/718; 343/767

(58) Field of Classification Search ............ 340/539.13, 340/539.1, 539.15, 573.1, 825.49, 825.69, 340/539.11; 343/742, 767, 788, 867, 718, 343/768; 455/344, 345, 347, 351
See application file for complete search history.

(56) References Cited

U.S. PATENT DOCUMENTS

| | | |
|---|---|---|
| 3,594,805 A | 7/1971 | Chardin |
| 4,584,709 A | 4/1986 | Kneisel et al. |
| 4,644,366 A | 2/1987 | Scholz |
| 4,712,112 A | 12/1987 | Carr |
| 4,754,285 A | 6/1988 | Robitaille |
| 4,805,232 A | 2/1989 | Ma |
| 4,814,776 A | 3/1989 | Caci et al. |
| 4,873,527 A | 10/1989 | Tan |
| 4,884,252 A | 11/1989 | Teodoridis et al. |
| 4,922,260 A | 5/1990 | Gaskill et al. |
| 4,977,614 A | 12/1990 | Kurcbart |
| 5,007,105 A * | 4/1991 | Kudoh et al. ............... 455/344 |
| 5,112,196 A | 5/1992 | Schuh |
| 5,128,686 A | 7/1992 | Tan et al. |
| 5,134,724 A | 7/1992 | Gehring et al. |
| 5,135,694 A | 8/1992 | Akahane et al. |
| 5,152,693 A | 10/1992 | Matsui et al. |
| 5,179,733 A | 1/1993 | Matsui |
| 5,243,356 A | 9/1993 | Hama |
| 5,317,326 A | 5/1994 | Tay et al. |
| 5,450,091 A * | 9/1995 | Hama ......................... 343/718 |
| 5,465,098 A | 11/1995 | Fujisawa et al. |
| 5,532,705 A | 7/1996 | Hama |
| 5,589,840 A | 12/1996 | Fujisawa |
| 5,673,054 A | 9/1997 | Hama |
| 5,678,216 A | 10/1997 | Matai |
| 5,734,353 A | 3/1998 | Van Voorhies |
| 5,742,256 A | 4/1998 | Wakabayashi |
| 5,826,178 A | 10/1998 | Owen |
| 5,886,669 A | 3/1999 | Kita |
| 5,945,958 A | 8/1999 | Staufer et al. |
| 5,986,566 A | 11/1999 | Yamamori |
| 6,008,761 A | 12/1999 | Harano |
| 6,025,813 A | 2/2000 | Hately et al. |
| 6,175,729 B1 | 1/2001 | He et al. |
| 6,329,903 B1 | 12/2001 | Yamamori |

(Continued)

Primary Examiner — Hung T. Nguyen
(74) Attorney, Agent, or Firm — Goodwin Procter LLP

(57) ABSTRACT

A body coupled antenna system usable in a personal locator unit includes an antenna element for connection to an RF circuit; a coupling plate for conductively coupling to an adjacent body for broadening the tuning frequency and reducing the loading sensitivity; a first capacitance interconnected between the coupling plate and the antenna element; and a second capacitance interconnected between the coupling plate and the RF circuit; the first and second capacitances being set to restore a predetermined matching impedance level while maintaining the broadened tuning frequency.

24 Claims, 4 Drawing Sheets

U.S. PATENT DOCUMENTS

| | | |
|---|---|---|
| 6,350,055 B1 | 2/2002 | Barras |
| 6,597,320 B2 | 7/2003 | Maeda et al. |
| 6,677,901 B1 | 1/2004 | Nalbandian |
| 6,731,246 B2 | 5/2004 | Parsche et al. |
| 6,927,739 B2 | 8/2005 | Nomura et al. |
| 7,038,634 B2 | 5/2006 | Bisig |
| 7,113,137 B2 | 9/2006 | Bisig |
| 7,242,359 B2 | 7/2007 | Turner et al. |

\* cited by examiner

BODY COUPLED ANTENNA SYSTEM AND PERSONAL LOCATOR UNIT UTILIZING SAME

FIELD OF THE INVENTION

This invention relates to body coupled antenna system and to a personal locator unit using such a body coupled antenna system.

BACKGROUND OF THE INVENTION

Personal locator devices which enable a missing person to be quickly located are in ever greater demand. The personal locator device should be securely attachable to the person's body so it cannot be accidentally easily discarded with clothing, for example, but be small enough and light enough for comfort and compatibility. One problem is that an RF transmitter or transmitter/receiver in such personal locator devices requires an antenna that is fairly large and can be extremely sensitive to the proximity and movement of the person's body or other bodies human or otherwise, e.g. bodies such as cars, buildings . . . . There have been a number of approaches to designing body worn RF transmitters/receivers that will function efficiently when worn on the body, typically on wrists or ankles. One approach is to shield the antenna from the body either with RF opaque materials or through physical separation. Another is to use the body to improve antenna functions. In one attempt the antenna is coupled to the wrist or ankle of the person. This requires an electrical antenna band around the wrist or ankle. This not only makes for an awkward and cumbersome arrangement for the wearer but adds to the manufacturing cost and difficulty. In addition the size of the antenna loop is subject to the size of the wearer's wrist or ankle and the looseness or tightness of the fit of the band attachment. See U.S. Pat. Nos. 4,873,527; 4,977,614; 6,175,729; 6,927,739. See also U.S. Pat. Nos. 5,532,705; 5,465,098; 5,673,054 referring to electric and magnetic fields and effects of antennas close to a body.

SUMMARY OF THE INVENTION

In accordance with various aspects of the subject invention in at least one embodiment the invention presents an improved body coupled antenna system and an improved personal locator unit utilizing such a body coupled antenna system which can be worn in close proximity to a human body or other body, with minimal effect on antenna efficiency, is small, easy to incorporate in a body coupled device and does not require electrical continuity around the body.

The subject invention results from the realization that, in part, an improved body coupled antenna system and an improved personal locator unit utilizing such a system can be achieved where the antenna is coupled to the ground plane of the body and the body coupling helps to efficiently convert the magnetic and electrical fields and the effective resistance of the body secures to further tune the antenna over a range of frequencies. The antenna system may include an inductance antenna element for connection to an RF circuit, a coupling plate for conductively coupling to an adjacent body for broadening the tuning frequency and reducing the loading sensitivity; a first capacitance interconnection between the coupling plate and the inductance antenna element; a second capacitance interconnection between the coupling plate and the RF circuit; the first and second capacitances being set to restore a predetermined matching impedance level while maintaining the broadened tuning frequency.

The subject invention, however, in other embodiments, need not achieve all these objectives and the claims hereof should not be limited to structures or methods capable of achieving these objectives.

In one embodiment a body coupled antenna system includes an antenna element for connection to an RF circuit and a coupling plate for conductively coupling to an adjacent body for broadening the tuning frequency and reducing the loading sensitivity. A first capacitance is interconnected between the coupling plate and the antenna element and a second capacitance is interconnected between the coupling plate and the RF circuit, the first and second capacitances are set to restore a predetermined matching impedance level while maintaining the broadened tuning frequency.

In preferred embodiments the antenna element may include a helical conductor. The coupling plate may be capacitively coupled to the adjacent body. The first and second capacitances may be adjustable. The body may be a human body. The antenna system may be worn on the body wrist. The antenna system may be contained in a housing adapted to be mounted on the body. The coupling plate may be separated by a gap from the body. The RF circuit may include a transmitter circuit. The RF circuit may include a transmitter and receiver circuit. The RF circuit may be contained in the housing. The housing may include a power supply for the RF circuit. The RF circuit may include a receiver circuit.

In another embodiment a personal locator unit includes a body coupled antenna system, an RF circuit, a housing for the body coupled antenna system and the RF circuit. The body coupled antenna system includes an antenna element for connection to the RF circuit, a coupling plate for conductively coupling to an adjacent body for broadening the tuning frequency and reducing the loading sensitivity and a first capacitance interconnected between the coupling plate and the antenna element. A second capacitance is interconnected between the coupling plate and the RF circuit and the first and second capacitances are set to restore a predetermined matching impedance level while maintaining the broadened tuning frequency.

In preferred embodiments the RF circuit may include a transmitter circuit. The RF circuit may include a transmitter circuit and receiver circuit. The RF circuit may include a decode circuit responsive to the receiver circuit, for identifying a personal identification code associated with the instant personal locator unit and a switch circuit for enabling the transmitter circuit. The transmitter circuit may transmit at least the personal identifier code associated with the instant personal locator unit. The RF circuit may include a power supply. The housing may include a device for carrying the housing on the body. The device may include a strap. The coupling plate may be capacitively coupled to the adjacent body. The coupling plate may be separated by a gap from the body. The RF circuit may include a receiver circuit.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
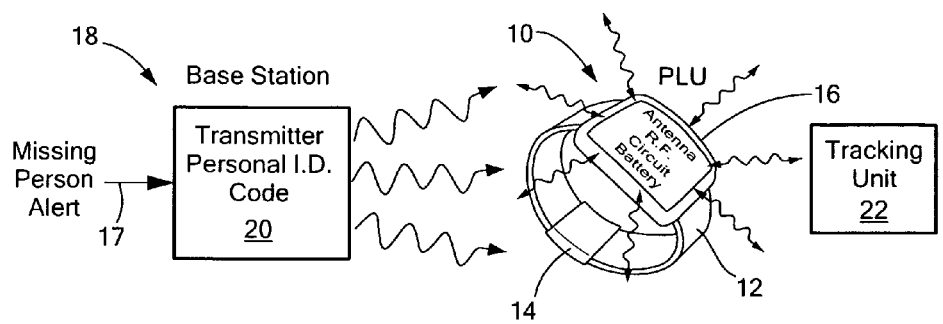
FIG. 1 is a schematic functional block diagram of a personal locator unit (PLU) including a body coupled antenna system according to one embodiment of this invention in the context of the supporting locator system including a station receiver and tracking unit.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
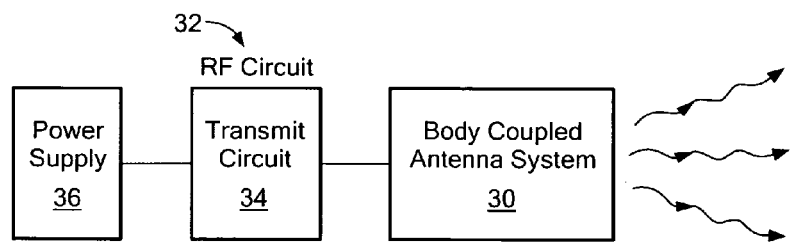
FIG. 2 is a schematic block diagram of one embodiment of the body coupled antenna system of FIG. 1.

There is shown in FIG. 1 a personal locator unit 10 according to this invention including a band 12 to be fastened around a human body, for example, a wrist or ankle using clasp 14. Band 12 carries housing 16 which contains a body coupled antenna according to this invention as well as an RF circuit and power source. When a person wanders the base station 18 detects that the PLU 10 is missing, and sends an alarm call to authorities. The tracking unit 22 is employed to detect the personal ID code from the PLU 10, and locate the missing person. The tracking unit 22 has a receiver that seeks the personal ID code from the PLU 10. The PLU sends out a tracking signal all the time; it is always running. It is a beacon, transmitting a locating chirp once per second. Typically the system operates in a 216 MHz range, but it is not limited to the VHF spectrum. Housing 16 of PLU 10 contains a body coupled antenna system 30, FIG. 2, according to this invention driven by an RF circuit 32, such as transmit circuit 34 with a power supply 36 which may be implemented commonly with a battery. Transmit circuit 34 may drive body coupled antenna system 30 continuously so that it always broadcasts its personal ID code or it may operate it to periodically broadcast its ID code to save power.

Figure 3:
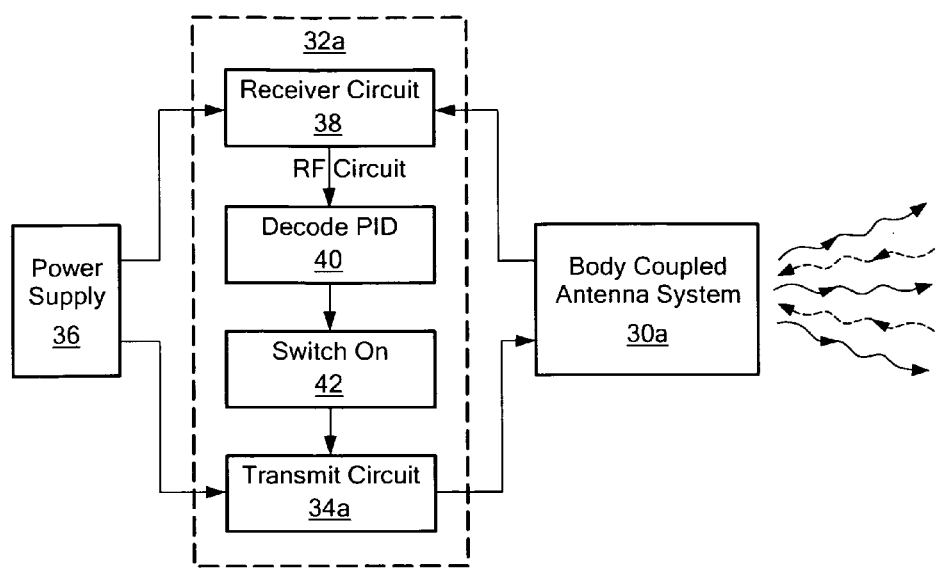
FIG. 3 is a schematic block diagram of another embodiment of the body coupled antenna system of FIG. 1.
Figure 4:
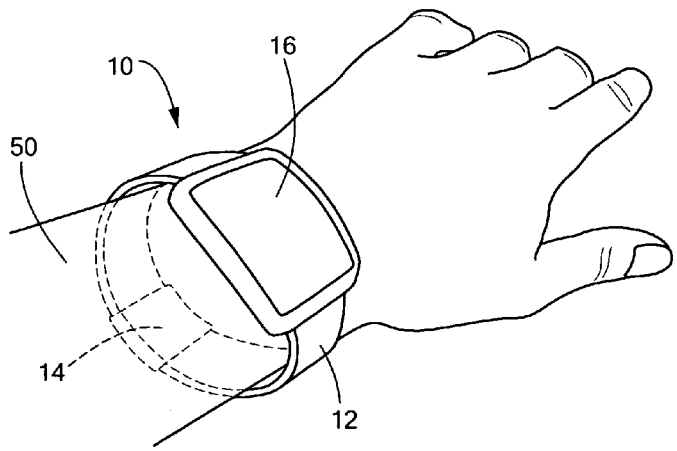
FIG. 4 is a three dimensional diagrammatic view of a personal locator unit including a body coupled antenna system secured by a wrist band on a human body.

Alternatively, RF circuit 32a, FIG. 3, may include a transmit circuit 34a, and a receiver circuit 38. In operation, an activation signal from a radio frequency network, containing the personal ID code of a missing person's PLU 10 is received by receiver circuit 38 of each PLU in the area, one of the PLU's having the correct ID recognizes the incoming personal ID code as its own in decoder 40 and through switching circuit 42 turns on transmit circuit 34a which performs as previously to produce a continuous or at least periodic broadcast from body coupled antenna system 30a of its personal ID code to be picked by one or more tracking unit 22. Typically the broadcast from body coupled antenna system 30a may be at 216 MHz and its reception may be at 170 MHz. The system may use a band of 60 frequencies in the 216 to 217 MHz range. The system could work on any frequency. When used on a human body PLU 10, FIG. 4, may be mounted on a wrist 50 of the human body by means of band 12 and clasp 14.

Figure 5:
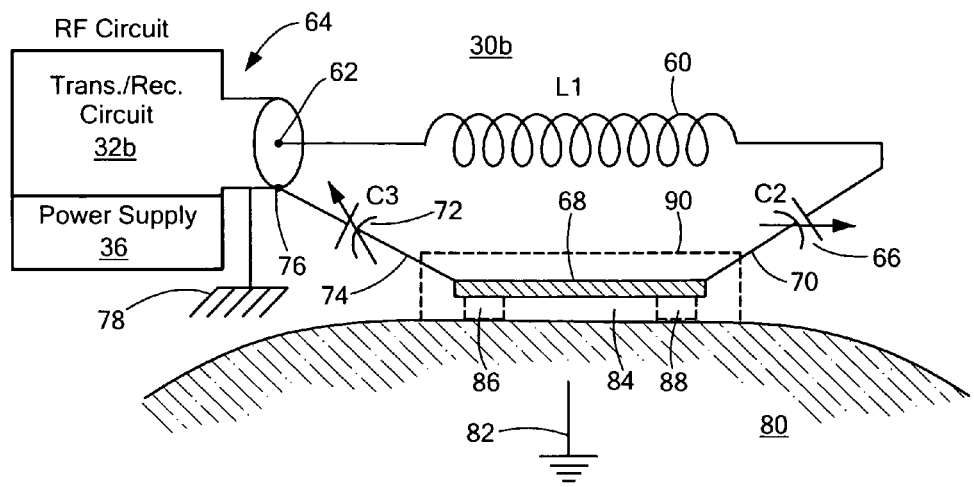
FIG. 5 is a more detailed schematic diagram of a body coupled antenna system according to one embodiment of the invention.

One embodiment of the body coupled antenna system 30b, FIG. 5, includes an inductance antenna element in the form of a helical coil 60 connected at one end to the center conductor 62 of coaxial cable 64 from RF circuit 32b. The other end of antenna element 60 is connected to capacitance C2 66 which may be adjustable and whose other end is connected to a body coupling plate 68 via conductor 70. The body coupling plate 68 is also connected to capacitance C3 72 through conductor 74. Capacitor 72 C3 completes the circuit to the outer shield 76 of coaxial cable 64. Coaxial cable 64 has a typical impedance of 50 ohms and may be connected to a reference point such as circuit or floating ground 78. A reactive coupling is effected between body coupling plate 68 and the neighboring body 80 which may typically be a human body, but may be other kinds of bodies, such as car bodies, or other bodies which present body ground 82. The reactive coupling may be resistive, with the body coupling plate 68 in direct contact with the body, or it may be capacitive, with the coupling provided over a gap 84 using for example, standoffs 86 and 88 or an encapsulating or partially encapsulating medium 90 all shown in phantom. In the range of 216 MHz conductance L1 60 can be in a range of 0.1 µH and capacitances C2 66 and C3 72 may be set to somewhere between two and ten pF. These capacitors may have established values or they may be made adjustable as shown in FIG. 5. Body coupling plate 68 would typically have a very small area of approximately one square inch and can be in direct contact with body 80 or can be separated as shown with a dielectric such as air.

Figure 6:
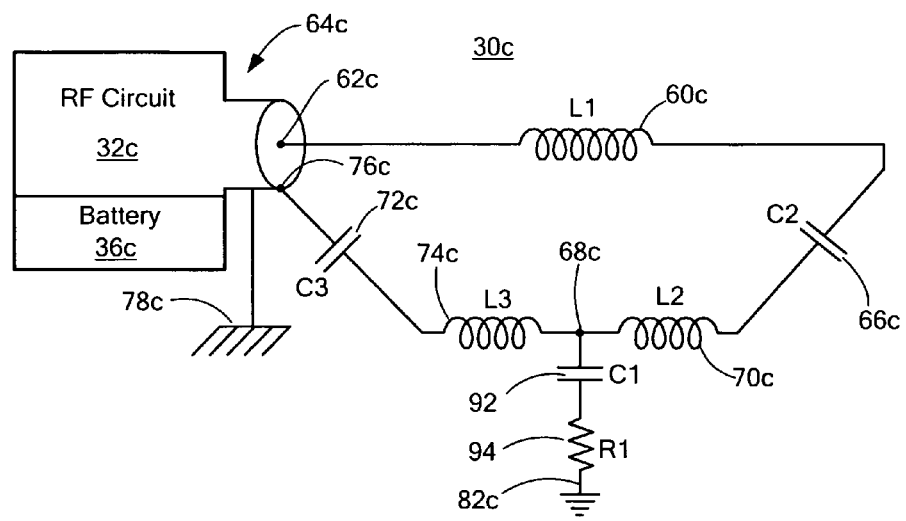
FIG. 6 is a more detailed equivalent circuit representation of a body coupled antenna system according to an embodiment of this invention.

A more detailed equivalent circuit of the body coupled antenna of this invention is shown in FIG. 6 where the power supply is shown as a battery 36c. Capacitances C2 66c and C3 72c are shown as fixed as opposed to variable capacitances and conductors 70c and 74c are represented by inductances L2 and L3, respectively. The reactive coupling between body coupling plate 68c and the body is shown as a reactive capacitance C1 92 and the body impedance is shown simply as a resistance R1 94. L1, the inductance antenna element 60c, is shown as a long helical coil of wire spanning the length of the antenna. Inductances 70c L2 and 74c L3 may be straight pieces of wire which together also span the length of the antenna. Capacitor C2 66c is at the right of the antenna and capacitor C3 72c is at the left of the antenna. The top plate of capacitor C1 92 is the body coupling plate 68c at the junction of inductances L2 70c and L3 74c. The bottom plate of capacitor C1 92 is the wrist of the person or some portion of the person's body or another body on which the system is mounted. Body impedance R1 94 is the surface resistance of the person's wrists and forearm. The body impedance 94 is shown here as a resistance but this is for simplification of explanation and is not a limitation. Body coupled antenna system 30c is driven by a 50 ohm coaxial cable 64c which has ferrites over it to inhibit currents flowing on the outside of the shield and forcing differential drive of the antenna. The antenna is actually driven from the RF circuit 32c which is floating.

The antenna may be more readily explained by deriving the elements one at a time. Thus, if all the elements other than L1 60c and C3 72c are removed that is C2 66c, L2 70c and L3 74c are replaced with short circuits and resistance R1 94 and capacitance C1 92 are opens, the antenna is then a series resonant tank circuit. In that case, the input impedance would be very low at resonance and the resonance would have a very high Q with sharp falloffs and a consequently high loading sensitivity as is the case for all electrically small antennas. It thus would be difficult to match to and very easy to detune because of its high load sensitivity. Either of these would dramatically reduce the efficiency of the antenna. At this point there are no currents on the outside shield 76 of the coaxial cable 64c because there is no parasitic path to ground from inductance L1 60c or capacitance C3 72c. If capacitance C1 92 and impedance R1 94 are added, there now is a parasitic path to ground through the body of the person represented by the ground symbol 82c at the bottom of impedance R1 94. The shield 76c of the coaxial cable 64c would also have a large capacitance to ground, so the coaxial cable would have to be heavily covered with ferrite to discourage the common mode current flowing to ground on the outside of the shield. With capacitance C2 66c, L2 70c and L3 74c still shorted, the series circuit of capacitance C1 92 through impedance R1 94 sits at the top of the series resonant tank circuit. It would thus de-Q or lower the Q of the circuit considerably. This would solve the easy to detune problem because now the resonance would have a lower Q and a consequent low loading sensitivity. However, this aggravates the matching problem because now the input impedance instead of being very low is very high. It would be difficult to match to such a high impedance without huge losses in the matching circuit. The losses of a matching circuit vary inversely with the physical size of the inductors in the matching circuit, making the matching circuit a problem not just because of the additional cost but the additional size as well. In accordance with this invention the notion is to use the antenna series resonant tank circuit itself to do the matching. Inductor L1 60c being quite large would have low loss. This is exactly what is done by introducing capacitance C2 66c. It moves the point of application of the de-Qing resistance impedance R1 94 to a lower impedance point on the resonant tank circuit. By properly choosing the ratio of C2 66c and C3 72c the input impedance which the coax drive sees can be set to 50 ohms for a perfect match. The setting can be done by trial and error and using fixed value capacitances as 66c and 72c or adjustable or variable capacitances could be permanently placed there. With such a setting, now, the Q of the antenna may still be too high. If it is, then capacitance C2 66c would have to be made larger and capacitance C3 72c made smaller. This is done by moving the application point of impedance R1 94 to a higher impedance point on the series resonant tank circuit. The RF circuit 32c would need to be replaced with a source with a higher source impedance or another matching circuit would be needed between the 50 ohm coax drive and the antenna. Another advantage of this antenna is that the de-Qing resistance R1 94 is spread over the forearm and thus the current through it would contribute to radiation.

Figure 7:
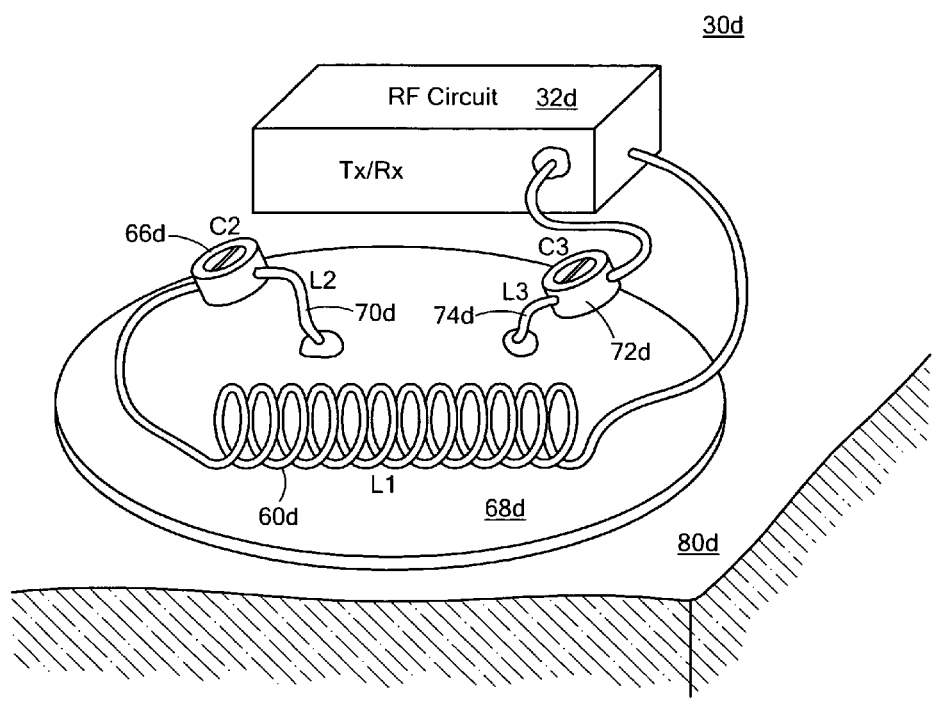
FIG. 7 is an enlarged, exploded view of components of one embodiment of a body coupled antenna system according to this invention.

The components of the body coupled antenna system 30d according to one embodiment is shown in FIG. 7 where the helical shape of the inductance antenna element, inductance L1 60d and the a circular form for the body coupling plate 68d is apparent. Capacitances C2 66d and C3 72d are shown here as variable or adjustable capacitances and the inductances L2 70d and L4 74d appear as simply conductors between capacitors 66d, 72d and body coupling plate 68d.

With respect to the body coupled antenna system of this invention it is understood that the body coupling element serves to de-tune the sharp Q factor of a typical tuned loop antenna. Furthermore, this de-tuning of the antenna is achieved without sacrificing the impedance matching of the antenna network to the transmitter: a standard 50 ohm impedance is maintained. The body coupling mechanism also serves to increase the effective ground plane for the antenna. It is believed that the helical antenna and perhaps the gap between the body coupling plate and the body act to increase the effect of the magnetic component of the radio waves. It is understood that very high frequency, e.g. VHF radio waves interact with the human body in a manner that reduces the electric field component and increases the magnetic component. An efficient antenna for VHF radio waves next to the human body then effectively converts the magnetic field to current flow in the antenna for a receiver or conversely when is acting as a transmitter. Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A body coupled antenna system comprising:
   an antenna element for connection to an RF circuit;
   a coupling plate for conductively coupling to an adjacent body for broadening a tuning frequency and reducing a loading sensitivity;
   a first capacitance interconnected between said coupling plate and said antenna element; and
   a second capacitance interconnected between the coupling plate and the RF circuit;
   said first and second capacitances being set to restore a predetermined matching impedance level While maintaining the broadened tuning frequency.

2. The body coupled antenna system of claim 1 in ich said antenna element includes a helical conductor.

3. The body coupled antenna system of claim 1 in which said coupling plate is capacitively coupled to the adjacent body.

4. The body coupled antenna system of claim 1 in which said first and second capacitances are adjustable.

5. The body coupled antenna system of claim 1 in which said body is a human body.

6. The body coupled antenna system of claim 5 in which said antenna system is worn on the body wrist.

7. The body coupled antenna system of claim 1 in which said antenna system is contained in a housing adapted to be mounted on the body.

8. The body coupled antenna system of claim 1 in which said coupling plate is separated by a gap from said body.

9. The body coupled antenna system of claim 1 in which said RF circuit includes a transmitter circuit.

10. The body coupled antenna system of claim 1 in which said RF circuit includes a transmitter and receiver circuits.

11. The body coupled antenna system of claim 7 in which said RF circuit is contained in said housing.

12. The body coupled antenna system of claim 7 in which said housing includes a power supply for the RF circuit.

13. The body coupled antenna system of claim 1 in which said RF circuit includes a receiver circuit.

14. A personal locator unit comprising:
   a body coupled antenna system;
   an RF circuit;
   a housing for said body coupled antenna system and said RF circuit;
   said body coupled antenna system including an antenna element for connection to the RF circuit;
   a coupling plate for conductively coupling to an adjacent body for broadening a tuning frequency and reducing a loading sensitivity;
   a first capacitance interconnected between said coupling plate and said antenna element;
and a second capacitance interconnected between the coupling plate and the RF circuit;
   said first and second capacitances being set to restore a predetermined matching impedance level while maintaining the broadened tuning frequency.

15. The personal locator unit of claim 14 in which said RF circuit includes a transmitter circuit.

16. The personal locator unit of claim 14 in which said RF circuit includes a transmitter circuit and receiver circuit.

17. The personal locator unit of claim 16 in which said RF circuit includes a decode circuit responsive to said receiver circuit, for identifying a personal identification code associated with the instant personal locator unit and a switch circuit for enabling said transmitter circuit.

18. The personal locator unit of claim 14 in which said transmitter circuit transmits at least said personal identifier code associated with the instant personal locator unit.

19. The personal locator unit of claim 14 in which said RF circuit includes a power supply.

20. The personal locator unit of claim 14 in which said housing includes a device for carrying said housing on the body.

21. The personal locator unit of claim 20 in which said device includes a strap.

22. The personal locator unit of claim 14 in which said coupling plate is capacitively coupled to the adjacent body.

23. The personal locator unit of claim 14 in which said coupling plate is separated by a gap from said body.

24. The personal locator unit of claim 14 in which said RF circuit includes a receiver circuit.

* * * * *